US011874739B2

(12) United States Patent
Gurumurthi et al.

(10) Patent No.: US 11,874,739 B2
(45) Date of Patent: Jan. 16, 2024

(54) ERROR DETECTION AND CORRECTION IN MEMORY MODULES USING PROGRAMMABLE ECC ENGINES

(71) Applicant: Advanced Micro Devices, Inc., Santa Clara, CA (US)

(72) Inventors: Sudhanva Gurumurthi, Austin, TX (US); Vilas Sridharan, Boxborough, MA (US); Shaizeen Aga, Santa Clara, CA (US); Nuwan Jayasena, Santa Clara, CA (US); Michael Ignatowski, Austin, TX (US); Shrikanth Ganapathy, Santa Clara, CA (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1 day.

(21) Appl. No.: 17/033,398

(22) Filed: Sep. 25, 2020

(65) Prior Publication Data
US 2022/0100606 A1 Mar. 31, 2022

(51) Int. Cl.
*G06F 11/10* (2006.01)
*G06F 21/60* (2013.01)
*H04L 9/32* (2006.01)

(52) U.S. Cl.
CPC ........ *G06F 11/1076* (2013.01); *G06F 21/602* (2013.01); *H04L 9/32* (2013.01)

(58) Field of Classification Search
CPC ....... G06F 11/1076; G06F 21/602; H04L 9/32
See application file for complete search history.

(56) References Cited

U.S. PATENT DOCUMENTS

| 2011/0162053 | A1* | 6/2011 | Pei | G06F 21/42 |
| | | | | 726/6 |
| 2011/0314354 | A1* | 12/2011 | Fillingim | G06F 11/1048 |
| | | | | 714/760 |
| 2020/0042471 | A1* | 2/2020 | Kerr | G06F 13/4291 |
| 2020/0356305 | A1* | 11/2020 | Kim | G06F 3/0659 |
| 2020/0364138 | A1* | 11/2020 | Howe | G06F 12/0215 |
| 2021/0089390 | A1* | 3/2021 | Lee | G06F 11/1048 |
| 2021/0208814 | A1* | 7/2021 | Song | G06F 7/52 |

* cited by examiner

*Primary Examiner* — Thien Nguyen
(74) *Attorney, Agent, or Firm* — Hickman Becker Bingham Ledesma LLP

(57) ABSTRACT

A memory module includes one or more programmable ECC engines that may be programed by a host processing element with a particular ECC implementation. As used herein, the term "ECC implementation" refers to ECC functionality for performing error detection and subsequent processing, for example using the results of the error detection to perform error correction and to encode corrupted data that cannot be corrected, etc. The approach allows an SoC designer or company to program and reprogram ECC engines in memory modules in a secure manner without having to disclose the particular ECC implementations used by the ECC engines to memory vendors or third parties.

20 Claims, 4 Drawing Sheets

- Create/select instructions that define an ECC implementation
  202
- A host establishes a connection with the memory module
  204
- The host transfers error correction code instructions to the memory module
  206
- The memory module receives and stores the error correction code instructions
  208
- The functionality provided by the error correction code instructions is made available for use
  210

ERROR DETECTION AND CORRECTION IN MEMORY MODULES USING PROGRAMMABLE ECC ENGINES

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Error Correction Code (ECC) memory modules implement an ECC engine to detect and correct internal data corruption. One of the limitations of conventional ECC memory modules is that the particular ECC implementation is designed into the logic of the memory module and cannot be changed. This means that manufacturers must choose an ECC implementation that provides the best compromise between error correction and performance for an expected use case that may change in the future. Another issue is that in some situations an ECC memory module must use the same ECC implementation as a host. As used herein, the term "host" refers to any type of processing element, such as a Central Processing Unit (CPU), Graphics Processing Unit (GPU), memory controller, etc. For example, if a Processing-In-Memory (PIM)-based memory module uses the result bits for internal error detection and correction, and to identify corrupted data that cannot be corrected, the PIM-based memory module and the host must use the identical ECC implementation to ensure the same level of error protection and avoid inconsistent use of the result bits. This is problematic because PIM-based memory modules may be designed for use with multiple hosts and yet the host designer or company, e.g., of a System-on-a-Chip (SoC), may not want the PIM-based memory vendor to know the ECC implementation they are using, which may be proprietary. There is therefore a need for a way to implement ECC memory modules that allows a host designer or company to use a particular ECC engine unbeknownst to the memory vendor.

BRIEF DESCRIPTION OF THE DRAWINGS

Embodiments are depicted by way of example, and not by way of limitation, in the figures of the accompanying drawings and in which like reference numerals refer to similar elements.

FIG. 2 is a flow diagram that depicts an approach for programming an ECC engine.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
    II. Architecture
    III. Programmable ECC Engines
    IV. Programming ECC Engines

I. Overview

A memory module includes one or more programmable ECC engines that are programed by a host processing element with a particular ECC implementation. As used herein, the term "ECC implementation" refers to ECC functionality for performing error detection and subsequent processing, for example using the results of the error detection to perform error correction and to encode corrupted data that cannot be corrected, etc. Instructions that implement an ECC engine are provided by a host to the memory module in a secure manner and may also be stored by the memory module in a secure manner. This allows an SoC designer or company to program and reprogram ECC engines in memory modules in a secure manner without having to disclose the particular ECC implementations used by the ECC engines to memory vendors or third parties. This also provides the flexibility for an SoC designer or company to choose a particular ECC implementation that provides the best compromise between error detection/correction and performance, and also change the ECC implementation later if needed.

II. Architecture

Figure 1A:
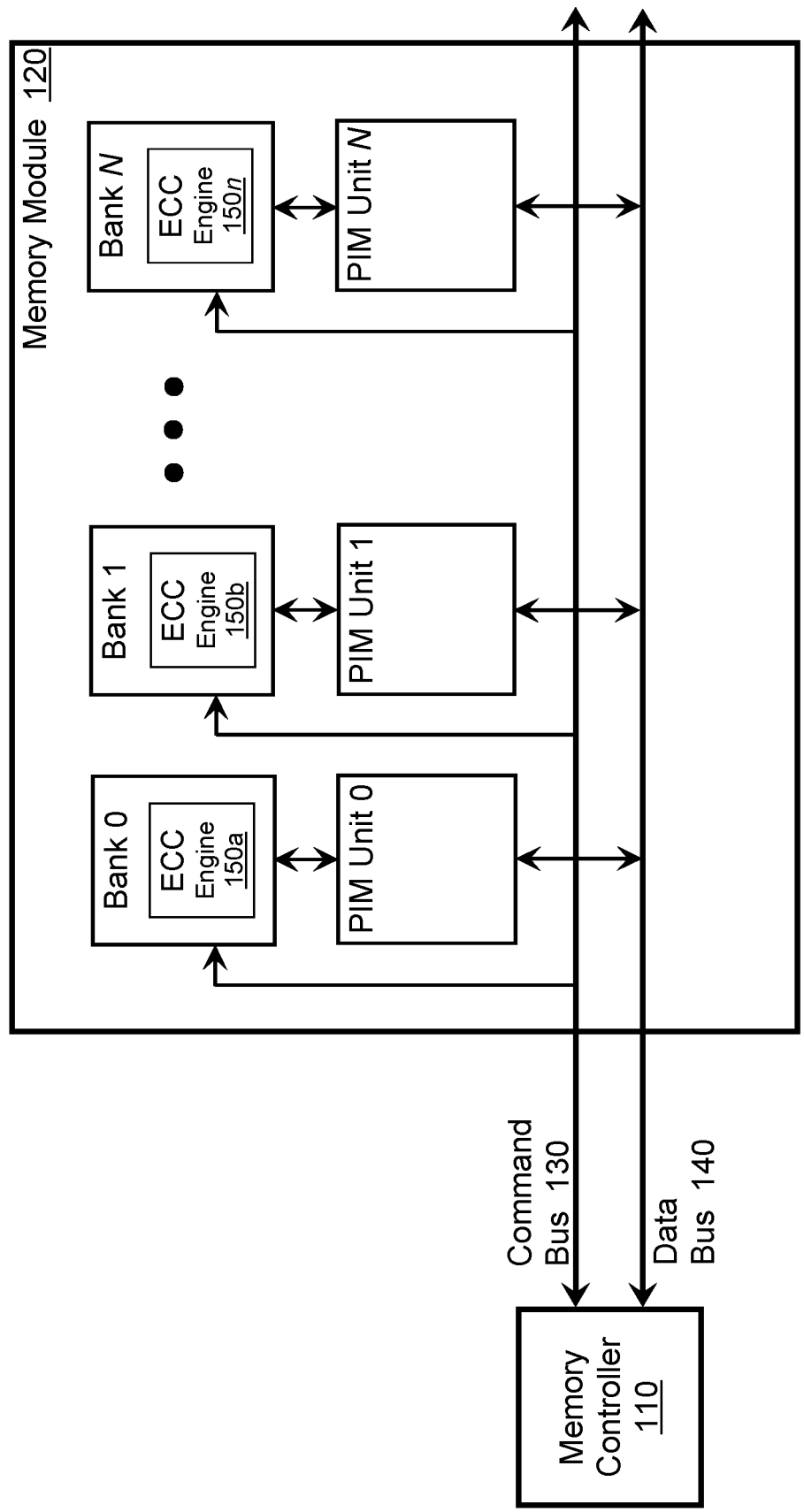
FIG. 1A is a block diagram that depicts a memory arrangement.

FIG. 1A is a block diagram that depicts a memory arrangement 100. The memory arrangement 100 includes a host 102, a memory controller 110 and a memory module 120. The memory controller 110 and the memory module 120 are communicatively coupled via a command bus 130 and a data bus 140. As used herein, the term "bus" refers to any type of wired or wireless electrical coupling, such as wires, conductors, and/or wireless communications links. In addition, although embodiments are described herein in the context of buses, embodiments are not limited to buses per se and are applicable to other forms of memory connections, such as serial links and capacitive/inductive coupling. Embodiments are depicted in the figures and described herein in the context of a single memory module 120 for purposes of explanation, but embodiments are applicable to memory arrangements with any number of memory modules.

The memory controller 110 manages the flow of data going to and coming from the memory module 120 and may be implemented as a stand-alone element, for example on a separate die from a microprocessor, implemented separate from but on the same die as a microprocessor, or integrated into a microprocessor as an integrated memory controller. The memory arrangement 100 may include other elements that are not depicted in the figures and described herein for purposes of explanation.

The memory module 120, which may be for example a DRAM memory module, includes a memory arrange having N+1 banks (Bank 0-Bank N) with corresponding PIM Units (PIM Unit 0-PIM Unit N). Each bank may include cells defined by a two-dimensional array, but embodiments are not limited to DRAM memory modules or banks per se, or banks with cells defined by a two-dimensional array, and are applicable to other memory cell organizations. The memory array and banks may include other elements, such as buffers and decoders, that are not depicted in the figures and described herein for purposes of explanation. The PIM units include processing logic and storage, such as local registers, for performing arithmetic operations. Although embodiments are depicted in the figures and described herein in the context of PIM-based memory modules, embodiments are not limited to this context and are applicable to non-PIM-based memory modules.

III. Programmable ECC Engines

According to an embodiment, the memory module 120 is configured with one or more programmable ECC engines. As used herein, the term "programmable ECC engine" refers to programmable processing logic that performs one or more ECC functions. Programmable ECC engines may be implemented in several different ways that may vary depending upon a particular implementation. Examples of programmable ECC engines include, without limitation, CPUs, GPUs, microcontrollers, Field Programmable Gate Arrays (FPGAs), Application Specific Integrated Circuits (ASICs), and other types of processing logic. The ECC engines may augment any ECC capabilities that are internal to the memory module 120, such as an on-die ECC engine in a High Bandwidth Memory-3 (HBM3) memory module. Alternatively, the ECC engines may provide the only ECC capabilities for a memory module.

Figure 1B:
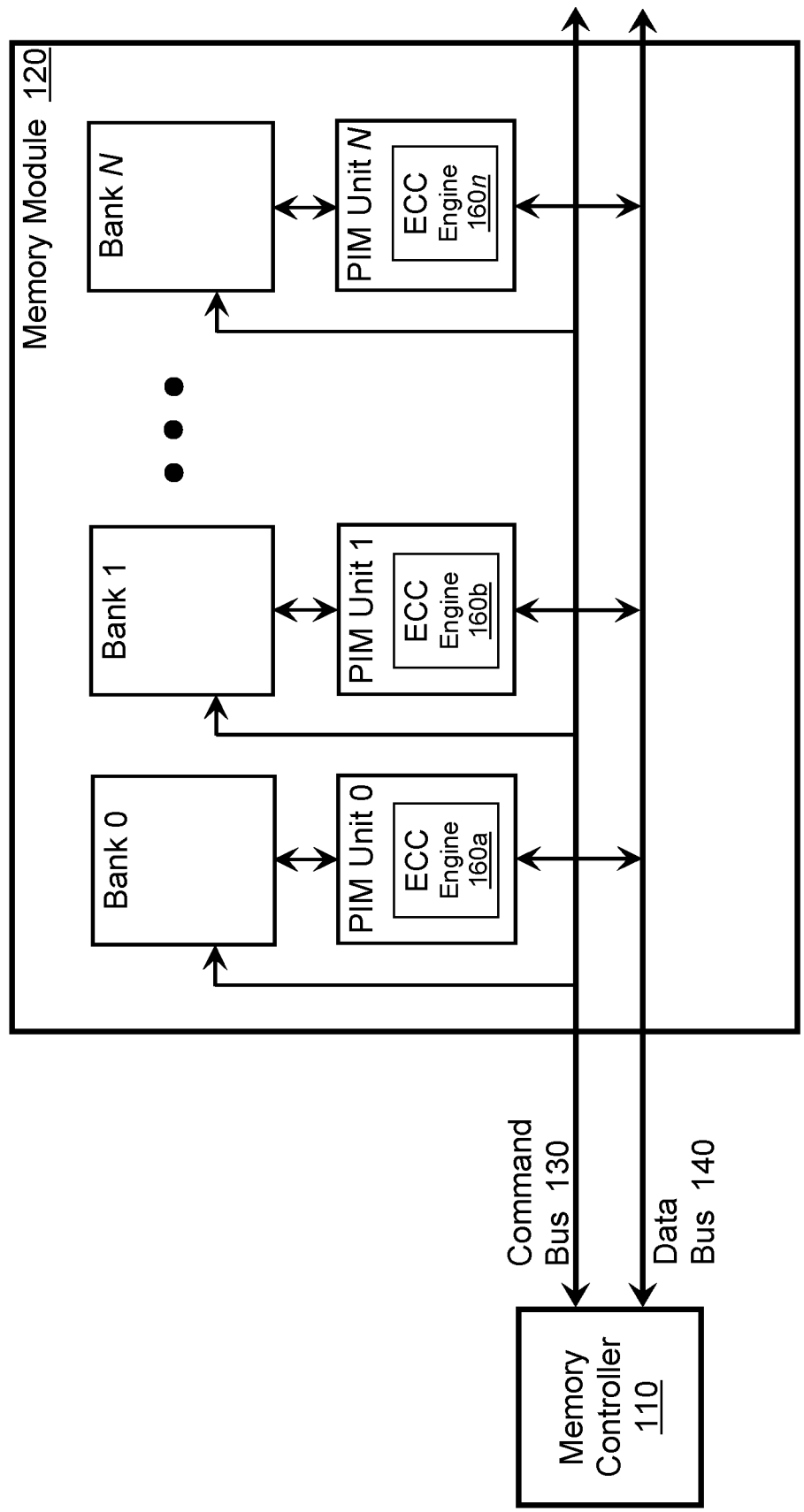
FIG. 1B depicts a memory arrangement in which programmable ECC engines are implemented in PIM units.
Figure 1C:
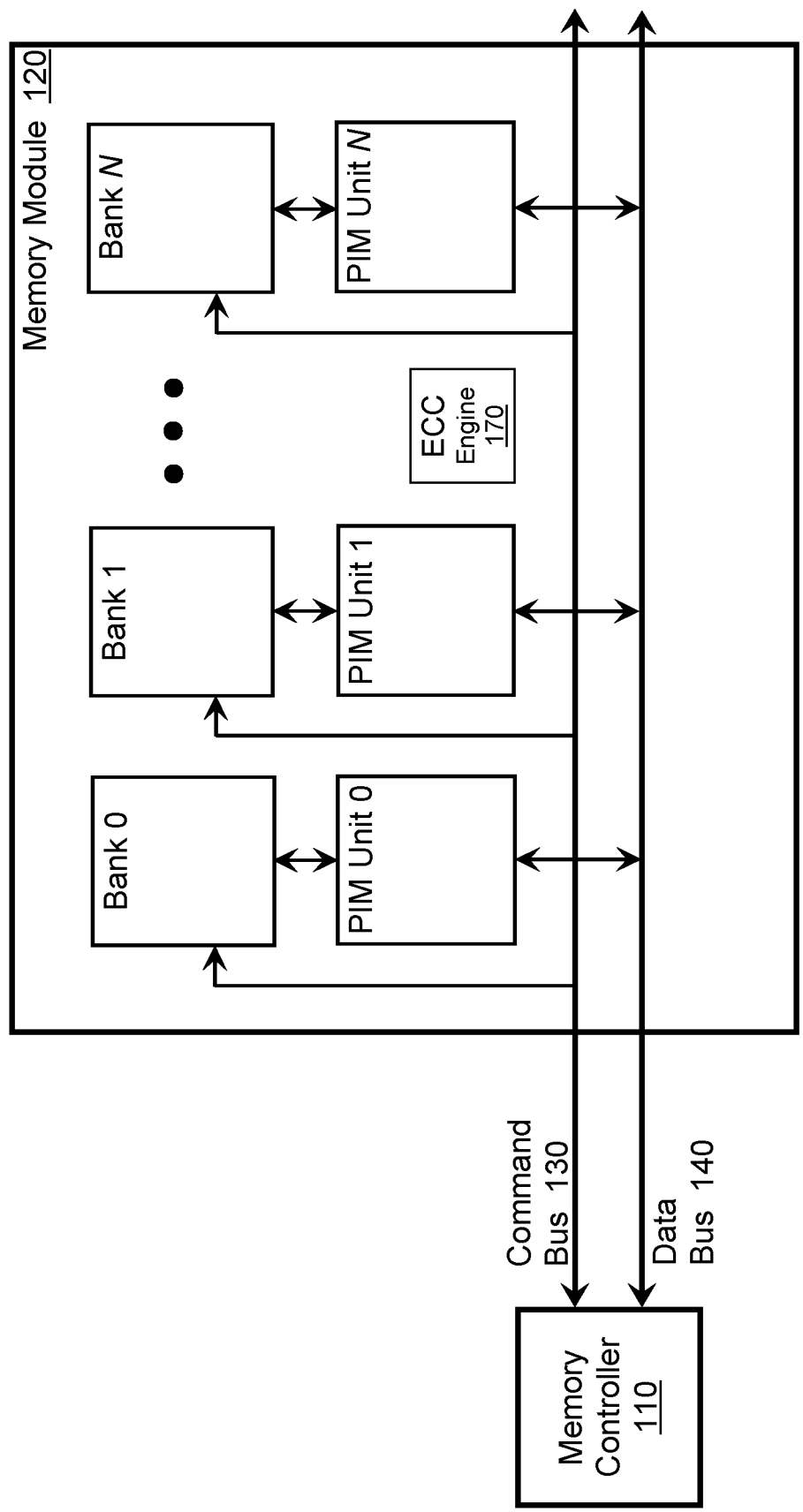
FIG. 1C depicts a memory arrangement in which a programmable ECC engine is implemented in a memory module separate from banks and PIM units.

The programmable ECC engines may be implemented in different locations within the memory module 120. In FIG. 1A, each of the banks includes a programmable ECC engine (ECC Engine 150a-ECC Engine 150n). FIG. 1B depicts the memory arrangement 100 in which the programmable ECC engines (ECC Engine 160a-ECC Engine 160n) are implemented in the PIM units. FIG. 1C depicts the memory arrangement 100 in which a programmable ECC engine 170 is implemented in the memory module 120 separate from the banks and the PIM units. In the example depicted in FIG. 1C, a single programmable ECC engine is shared by the PIM units, but the memory module 120 may be configured with multiple programmable ECC engines that are shared by the PIM units to improve performance, or even one programmable ECC engine for each PIM unit. As another example, a multi-layer memory module may be configured with one ECC engine per layer.

A host processing element, also referred to herein as a "host," programs a programmable ECC engine by providing, to the programmable ECC engine, error correction code instructions that define a particular ECC implementation. For example, an ECC engine in the form of an FPGA, EPROM, etc., may be programmed with a set of error correction code instructions that defines a particular ECC implementation. As another example, the host may provide, to a memory module for execution by a PIM unit or a microcontroller, a set of error correction code instructions that defines a particular ECC implementation. The error correction code instructions are processed by the processing logic of the PIM units that is used for processing PIM commands, by separate processing logic within the PIM units, or a microcontroller within the PIM units. Alternatively, the error correction code instructions may be processed by a separate microcontroller within the memory module 120, for example by the programmable ECC engine 170. Processing of the error correction code instructions causes the ECC implementation to be instantiated and made ready for use.

The error correction code instructions that define an ECC implementation may be stored in the memory array, i.e., the banks, of the memory module 120 as depicted in FIG. 1A. Alternatively, the error correction code instructions may be stored in the PIM units as depicted in FIG. 1B, or in the programmable ECC engine 170 as depicted in FIG. 1C. Error correction code instructions may be any type or form of instructions. For example, error correction code instructions may be in the form of source code, e.g., Register Transfer Language (RTL) instructions, parsed source code, compiled code, e.g., object code, or executable code, e.g., binary code. Another example form of instructions is a hardware description language used with FPGAs, such as Verilog and VHDL. A host may compile source code to create executable code that is provided to a PIM module to be stored and executed. Alternatively, a host may provide source code to a PIM or microcontroller that compiles the source code to create executable code that is stored and executed. Thus, the creation of executable code from source code may be performed at a host or at a memory module.

Error correction code instructions may be stored in a manner that prevents third parties from reading the error correction code instructions. For example, error correction code instructions may be stored in a secure portion of the memory array that is accessible only by the corresponding PIM unit or the programmable ECC engine 170. The memory array may be configured with a portion that is reserved for a PIM unit or the ECC engine 170. Alternatively, error correction code instructions may be stored in a secure storage location within the PIM units or the programmable ECC engine 170. For example, error correction code instructions may be stored in an EPROM or registers accessible only by the PIM units or the programmable ECC engine 170. According to an embodiment, error correction code instructions are protected by rendering the storage locations where the error correction code instructions are stored as non-readable, e.g., by blowing fuses on a PROM. As another example, error correction code instructions may be stored only in executable form to prevent a third party from reverse engineering the source code. As yet another example, error correction code instructions may be stored in an encrypted form and decrypted by an ECC engine using a decryption key before being processed. For example, the PIM units may be configured with a particular decryption key that is used to decrypt encrypted error correction code instructions provided by a host.

The programmable ECC engines may expose a specific set of commands to control access by the PIM units to the ECC logic implemented by the programmable ECC engines. According to an embodiment, a programmable ECC engine provides a command for invoking an ECC algorithm when data is written to a storage location and another command for invoking the ECC algorithm when data is read from a storage location. For example, when a PIM unit executes a store command, the PIM unit executes a "PROG_ENCODE_ECC" command that takes the data word that is to be written to a storage location, e.g., 256 bits in HBM3, as input, invokes the ECC encoder, and generates the error check results, e.g., check bits, for the data word. The PIM unit then stores the data word and error check results into metadata bits associated with the data word. Similarly, when a PIM unit executes a load (retrieve) command, the PIM executes a "PROG_DECODE_ECC" command that takes the data word and associated metadata bits that are read from the storage location, e.g., 272 bits in HBM3, as input, invokes the ECC decoder, and generates the ECC syndrome that specifies where there is an error and if so, which bit(s) is/are incorrect. This approach allows the programmable ECC engines to be implemented as a "black box" that is invoked by the PIM units when data is stored to or retrieved from the banks.

The use of programmable ECC engines as described herein is not limited to data stored to and retrieved from the memory array, e.g., the banks, of a memory module. According to an embodiment, the programmable ECC engines perform ECC processing on data written to and read from the PIM units. For example, the command processing logic in a PIM unit may invoke the "PROG_ENCODE_ECC" function for PIM commands that write the results of PIM arithmetic operations to one or more local PIM registers in the PIM unit. Similarly, the command processing logic in a PIM unit may invoke the "PROG_DECODE_ECC" function for PIM commands that read data from local PIM unit registers, e.g., data used as source operands for PIM arithmetic operations.

According to an embodiment, ECC engines have multiple ECC implementations. The ECC implementations may use different error detection algorithms, e.g., different strength error detection, and/or different algorithms for processing error detection results, e.g., for encoding corrupted data that cannot be corrected. Different ECC implementations may also have different computational expenses. For example, the error correction code instructions that define a particular ECC engine may include functions "PROG_EN-CODE_ECC1," "PROG_ENCODE_ECC2," etc., and corresponding functions "PROG_DECODE_ECC1," "PROG_DECODE_ECC2," that each implement a different level of ECC detection and correction.

Configuring an ECC engine with multiple ECC implementations provides greater flexibility in various situations. For example, a host may instruct a memory module to use a first ECC implementation and later switch to a second ECC implementation. If the result bits are used differently in the first and second ECC implementations this may require clearing the data from memory, e.g., via a system reset. As another example, a PIM unit may invoke a first ECC implementation when storing data to and retrieving data from the memory array in a memory module, where the first ECC implementation is the same ECC implementation used by a host. The PIM unit invokes a second, different, ECC implementation when storing data to and retrieving data from storage locations, such as registers, in the PIM unit. This allows, for example, a stronger ECC implementation to be used by the PIM unit when storing data to and retrieving data from storage locations in the PIM unit. This also allows the PIM unit to use the error detection results in a different manner than the host, for example, to encode corrupted data that cannot be corrected.

IV. Programming ECC Engines

According to an embodiment, programmable ECC engines are programmed in a secure manner to prevent unauthorized access by third parties to the particular ECC implementation used by the programmable ECC engines. This allows host designers and companies, such as SoC designer and companies, to prevent memory vendors, and other third parties, from knowing the details of their ECC implementation, which may be proprietary. ECC engines may be programmed at any time, for example, prior to or after a memory module is shipped from a memory vendor. Embodiments described herein may also be used to reprogram ECC engines that have previously been programmed. For example, the ECC engines in a memory module may be initially programmed prior to being shipped from a memory vendor and then reprogrammed after being placed in service. This may be done, for example, to fix a bug in a particular ECC implementation or to match the ECC implementation of a host that was changed. Programmable ECC engines may be programmed individually or in batches, e.g., using a broadcast approach.

FIG. 2 is a flow diagram 200 that depicts an approach for programming an ECC engine according to an embodiment. This example is described in the context of programming a particular ECC engine for purposes of explanation, but embodiments are not limited to programming ECC engines on an individual basis and multiple ECC engines may be programmed at the same time, e.g., using a broadcast approach.

In step 202, error correction code instructions that define an ECC implementation are created or selected. The error correction code instructions may be manually created by a user, e.g., by a user entering instructions into a file or document using a file editor or a word processor. The instructions may be in any form, such as source code, intermediate code, or even executable code. For example, a user may use a file editor executing on a host computer system to manually enter source code, such as RTL instructions, into a file, where the source code implements a particular ECC implementation.

Alternatively, a set of error correction code instructions that defines an ECC implementation may be selected from pre-defined sets of error correction code instructions that correspond to different ECC implementations. For example, the host computer system may include an ECC management application with a graphical user interface that displays a list of pre-defined sets of error correction code instructions, where each pre-defined set of error correction code instructions defines a particular ECC implementation. The pre-defined sets of error correction code instructions may be in any form that may vary depending upon a particular implementation, and different sets of error correction code instructions may be in different forms. For example, some of the sets of pre-defined error correction code instructions may be in source code form, while other pre-defined sets of error correction code instructions may be in executable form including, for example, a bit stream for configuring an FPGA.

The list may include information that identifies the corresponding ECC implementations. For example, the list may include a description of the particular ECC implementation for each pre-defined set of error correction code instructions. The graphical user interface includes controls that allow the user to select a particular pre-defined set of error correction code instructions to be used to program a target ECC engine. The graphical user interface may visually indicate a particular ECC implementation that is currently implemented by the host to server as a default value for programming ECC engines.

In step 204, a host establishes a connection with the memory module 120. The memory module may be selected from a list of available memory modules via the graphical user interface of the ECC management application. Alternatively, the approach may transfer the error correction code instructions to all the ECC engines in a memory module, e.g., by broadcasting the error correction code instructions to all the ECC engines in the memory module 120, or even ECC engines across multiple memory modules. This may be performed, for example, using the processing logic layer of an HBM3 memory module.

According to an embodiment, the connection between the host and the memory module 120 is a secure connection to allow instructions that define an ECC implementation to be transmitted to the memory module 120 in a secure manner. Embodiments are applicable to any approach for exchanging data between computing entities in a secure manner and are not limited to any particular approach. One non-limiting example of an approach for securely exchanging data between two computing entities is described in the Security Protocol and Data Model (SPDM) Specification. Other approaches include authenticating the host and the memory module. End point authentication may be used, for example, when ECC engines are to be programmed with a public ECC implementation and there is less concern of the error correction code instructions being obtained by a third party. Authentication may include the host and the memory module 120 authenticating each other using an internal or external authentication mechanism, such as an authentication service.

Alternatively, or in addition to authentication, the error correction code instructions may be transmitted in a secure manner using, for example, encryption. Any type of symmetric or asymmetric encryption, such as public key encryption, may be used to encrypt data transmitted between the host and the memory module 120, including the error correction code instructions. While potentially requiring more overhead than using authentication, encryption makes it more difficult for any third party to determine the particular ECC implementation being used with an ECC engine.

In step 206, the host transfers the error correction code instructions to the memory module 120. This may include the host pre-processing the error correction code instructions to put them in a form required by a particular transfer mechanism being used. The transfer may be initiated, for example, by the host issuing a special PIM command to a PIM unit, or all of the PIM units in the memory module 120, to store the error correction code instructions in a specified location. The specified location may be included in the special PIM command or the PIM unit may be configured to with the specified location. The memory module interface may be configured to support the special PIM command. The specified location may be various locations within the memory module 120, such as in the PIM unit, in the memory array, or in an ECC engine, such as the ECC engine 170. For example, the host may transfer the error correction code instructions to an FPGA in the memory module 120. As another example, the host may transfer the error correction code instructions to the processing logic layer of the memory module 120, such as the processing logic layer of an HBM3 memory module.

In step 208, the memory module 120 receives and stores the error correction code instructions. For example, the target PIM unit receives and stores the error correction code instructions in the memory array, in its own storage locations, or in an ECC engine, such as the ECC engine 170. If the target PIM is the only recipient of the error correction code instructions, then the target PIM unit may forward the error correction code instructions to other PIM units in the memory module 120. As another example, if the host transferred the error correction code instructions in the form of a bit stream to an FPGA in the memory module 120, then the FPGA stores the bit stream in non-volatile memory for use on powerup, such as a Flash chip, EEPROM, etc.

As previously described herein, the memory module 120 may store the error correction code instructions in a secure manner, for example by storing the error correction code instructions in a portion of the memory array that is accessible only by the corresponding PIM unit or the programmable ECC engine 170, in local storage within the PIM units or the programmable ECC engine 170, such as in an EPROM, or in an encrypted form.

The step of the memory module 120 receiving and storing the error correction code instructions may include other processing. For example, if the error correction code instructions are encrypted, the memory module 120 decrypts the encrypted error correction code instructions to recover the original error correction code instructions using the appropriate private key, depending upon whether public key encryption or symmetric key encryption was used. Also, the memory module 120 may process the instructions, for example process source code to create executable code. This may be done by the target PIM or the ECC engine 170. The resulting processed error correction code instructions are then stored in the specified location.

In step 210, the functionality provided by the error correction code instructions is made available for use.

The invention claimed is:

1. A memory module comprising a memory array; and configured to:
   store, in a portion of the memory array that is accessible only by the memory module, instructions to perform error detection and correction on data stored in the memory array, and
   cause the instructions to be processed to perform error detection and correction on the data stored in the memory array in response to one or more Processing-In-Memory (PIM) commands from a host processing element.

2. The memory module of claim 1, wherein a host processing element uses an ECC implementation defined by the instructions to perform error detection and correction on the data at the host processing element.

3. The memory module of claim 1, wherein:
   the instructions are in a source code form, and
   the memory module is further configured to:
      cause the instructions in the source code form to be processed to generate instructions in an executable form, and
      cause the instructions in the executable form to be executed.

4. The memory module of claim 1, wherein the memory module is further configured to protect the instructions by storing the instructions in one or more of:
   a protected portion of the memory array, or
   in an encrypted form.

5. The memory module of claim 1, wherein the memory module is further configured to cause the instructions to be processed to invoke an ECC implementation defined by the instructions when one or more of:
   data is stored to or read from the memory array, or
   data is stored to or read from one or more storage locations that are local to the memory module.

6. The memory module of claim 1, wherein the memory module is configured to:
   process the one or more PIM commands from the host processing element, and
   cause the instructions to be processed to invoke an ECC implementation defined by the instructions when processing the one or more PIM commands causes one or more of: storing data to or reading data from the memory array, or storing data to or reading data from one or more storage locations that are local to the memory module.

7. The memory module of claim 6, wherein:
the ECC implementation is a first ECC implementation,
the instructions further define a second ECC implementation that is different than the first ECC implementation, and
the memory module is further configured to invoke the first ECC implementation when storing data to or reading data from the memory array and invoke the second ECC implementation when storing data to or reading data from the one or more storage locations that are local to the memory module.

8. The memory module of claim 1, wherein the memory module is further configured to store the instructions in a Field Programmable Gate Array (FPGA).

9. The memory module of claim 1, wherein the memory module is further configured to perform one or more of:
authenticate a host processing element from which the instructions were received and authenticate itself to the host processing element, or
receive the instructions in encrypted form and decrypt the instructions to recover error code instructions.

10. The memory module of claim 1, wherein the memory module is further configured to:
receive, via a connection with a host processing element, second instructions that define a second ECC implementation, and store the second instructions to enable the memory module to perform error detection and correction on data stored in the memory array using the second ECC implementation, and
cause the instructions to be processed to perform error detection and correction on the data stored in the memory array using the second ECC implementation.

11. A method comprising:
storing, in a portion of a memory array that is accessible only by a memory module, instructions for performing error detection and correction on data stored in the memory array, and
causing, by the memory module, the instructions to be processed to perform error detection and correction on the data stored in the memory array in response to one or more Processing-In-Memory (PIM) commands received from a host processing element.

12. The method of claim 11, wherein:
the instructions are in a source code form, and
the method further comprises the memory module:
causing the instructions in the source code form to be processed to generate instructions in an executable form, and
causing the instructions in the executable form to be executed.

13. The method of claim 11, further comprising protecting, by the memory module, the instructions by storing the instructions in one or more of:
a protected portion of the memory array, or
in an encrypted form.

14. The method of claim 11, further comprising:
processing, by the memory module, the one or more PIM commands received from the host processing element, and
causing, by the memory module, the instructions to be processed to invoke an ECC implementation defined by the instructions when processing the one or more PIM commands causes one or more of: storing data to or reading data from the memory array, or storing data to or reading data from one or more storage locations that are local to the memory module.

15. The method of claim 14, wherein:
the ECC implementation is a first ECC implementation,
the instructions further define a second ECC implementation that is different than the first ECC implementation, and
the method further comprises the memory module invoking the first ECC implementation on data stored in the memory array of the memory module and invoking the second ECC implementation on data stored in a storage location that is local to the memory module.

16. The method of claim 11, further comprising one or more of:
authenticating, by the memory module, a host processing element from which the instructions were received and itself to the host processing element, or
receiving, by the memory module, the instructions in encrypted form and decrypting the instructions to recover error code instructions.

17. A host processing element configured to:
establish a connection with a memory module, and
cause instructions to be transmitted to the memory module via the connection and stored in a portion of a memory array that is accessible only by the memory module to enable the memory module to perform error detection and correction on data stored in the memory array of the memory module in response to one or more Processing-In-Memory (PIM) commands received from the host processing element.

18. The host processing element of claim 17, further configured to perform one or more of authenticate the memory module or encrypt the instructions prior to being transmitted to the memory module.

19. The host processing element of claim 17, wherein:
the instructions define a first ECC implementation and a second ECC implementation that is different than the first ECC implementation, and
the memory module invokes the first ECC implementation on data stored in the memory array of the memory module and invokes the second ECC implementation on data stored in a storage location that is local to the memory module.

20. The host processing element of claim 17, further configured to cause to be transmitted to the memory module via a secure connection, second instructions to replace the instructions, wherein the second instructions define a second ECC implementation that is different than an ECC implementation defined by the instructions, wherein the second instructions are to be used by the memory module to perform error detection and correction on the data stored in the memory array.

* * * * *